(12) United States Patent
Goudarzi et al.

(10) Patent No.: US 11,635,848 B2
(45) Date of Patent: Apr. 25, 2023

(54) LOW GROUND MASS CORRECTION FOR CAPACITIVE IMAGING SENSORS

(71) Applicant: Synaptics Incorporated, San Jose, CA (US)

(72) Inventors: Katayoun Goudarzi, Los Gatos, CA (US); David Hoch, Hickory, NC (US); Tracy Scott Dattalo, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/388,000

(22) Filed: Jul. 28, 2021

(65) Prior Publication Data

US 2022/0050548 A1 Feb. 17, 2022

Related U.S. Application Data

(60) Provisional application No. 63/066,123, filed on Aug. 14, 2020.

(51) Int. Cl.
| G06F 3/044 | (2006.01) |
| G06F 3/041 | (2006.01) |
| G01V 3/08 | (2006.01) |

(52) U.S. Cl.
CPC ............ *G06F 3/0418* (2013.01); *G01V 3/088* (2013.01); *G06F 3/0446* (2019.05); *G06F 3/041662* (2019.05)

(58) Field of Classification Search
CPC ............ G06F 3/0418; G06F 3/041662; G06F 3/0446; G06F 3/0443; G06F 3/0448; G06F 3/0412; G06F 3/0445; G01V 3/088
See application file for complete search history.

(56) References Cited

U.S. PATENT DOCUMENTS

| 9,791,970 | B2 | 10/2017 | Hoch | |
| 2010/0292945 | A1* | 11/2010 | Reynolds | G06F 3/0446 |
| | | | | 702/65 |
| 2013/0069905 | A1* | 3/2013 | Krah | G06F 3/04182 |
| | | | | 345/174 |
| 2013/0147752 | A1* | 6/2013 | Simmons | G06F 3/0443 |
| | | | | 345/174 |

(Continued)

*Primary Examiner* — Md Saiful A Siddiqui
(74) *Attorney, Agent, or Firm* — Ferguson Braswell Fraser Kubasta PC

(57) ABSTRACT

A capacitive sensing input system includes sensor electrodes disposed in a sensor electrode pattern and a processing system. When under a low ground mass (LGM) condition, proximity-sensing pairs of electrodes formed by a first selective pairing of the sensor electrodes have an increased sensitivity to a presence of an input object in comparison to LGM-sensitive pairs of electrodes formed by a second selective pairing of the sensor electrodes that are primarily sensitive to the LGM condition. The processing system is configured to, while under the LGM condition, determine a first LGM term using a mutual capacitance sensing with a first of the LGM-sensitive pairs of electrodes, obtain a first transcapacitance sensing signal for a sensing element formed by a first of the proximity-sensing pairs of electrodes, and generate an LGM-corrected transcapacitance sensing signal by correcting the first transcapacitance sensing signal using the first LGM term.

17 Claims, 11 Drawing Sheets

(56) References Cited

U.S. PATENT DOCUMENTS

| | | | |
|---|---|---|---|
| 2015/0277618 A1* | 10/2015 | Bulea | G06F 3/04162 |
| | | | 345/174 |
| 2015/0378467 A1* | 12/2015 | Hoch | G06F 3/0443 |
| | | | 345/174 |
| 2017/0010701 A1* | 1/2017 | Tsai | G06F 3/041 |
| 2020/0150795 A1* | 5/2020 | Park | G06F 3/04182 |

* cited by examiner

LOW GROUND MASS CORRECTION FOR CAPACITIVE IMAGING SENSORS

CROSS REFERENCE TO RELATED APPLICATIONS

The present application claims priority under 35 U.S.C. § 119(e) to U.S. Provisional Application No. 63/066,123, filed on Aug. 14, 2020, having at least one of the same inventors as the present application, and entitled, "LOW GROUND MASS CORRECTION FOR CAPACITIVE IMAGING SENSORS". U.S. Provisional Application No. 63/066,123 is incorporated herein by reference.

TECHNICAL FIELD

The described embodiments relate generally to electronic devices, and more specifically, to improving the performance of capacitive imaging sensors in presence of low ground mass conditions.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices are typically used in combination with other supporting components, such as display or input devices found in the electronic or computing system. In some configurations, the proximity sensor devices are coupled to these supporting components to provide a desired combined function or to provide a desirable complete device package. Proximity sensor devices utilize one or more electrical techniques to determine the presence, location and/or motion of an input object, such as a capacitive sensing technique. The proximity sensor devices often use an array of sensor electrodes arranged in a sensor pattern to detect the presence, location and/or motion of an input object.

Capacitive sensing may suffer from low ground mass artifacts resulting in sensing inaccuracies, for example, when the electronic device has a small self-capacitance, if it is poorly grounded, and/or if the stack-up of the proximity sensor device in the electronic device is sufficiently thin.

Therefore, it is desirable to provide methods and systems to address the low ground mass artifacts.

SUMMARY

In general, in one aspect, one or more embodiments relate to a capacitive sensing input system comprising: a plurality of sensor electrodes disposed in a sensor electrode pattern, wherein, when under a low ground mass (LGM) condition: proximity-sensing pairs of electrodes formed by a first selective pairing of the plurality of sensor electrodes have an increased sensitivity to a presence of an input object in comparison to LGM-sensitive pairs of electrodes formed by a second selective pairing of the plurality of sensor electrodes that are primarily sensitive to the LGM condition; and a processing system configured to, while under the LGM condition: determine a first LGM term using a mutual capacitance sensing with a first of the LGM-sensitive pairs of electrodes; obtain a first transcapacitance sensing signal for a sensing element formed by a first of the proximity-sensing pairs of electrodes; and generate an LGM-corrected transcapacitance sensing signal by correcting the first transcapacitance sensing signal using the first LGM term.

In general, in one aspect, one or more embodiments relate to a processing system interfacing with a plurality of sensor electrodes disposed in a sensor electrode pattern, wherein, when under a low ground mass (LGM) condition: proximity-sensing pairs of electrodes formed by a first selective pairing of the plurality of sensor electrodes have an increased sensitivity to a presence of an input object in comparison to LGM-sensitive pairs of electrodes formed by a second selective pairing of the plurality of sensor electrodes that are primarily sensitive to the LGM condition, wherein the processing system, while under the LGM condition, is configured to: determine a first LGM term using a mutual capacitance sensing with a first of the LGM-sensitive pairs of electrodes; obtain a first transcapacitance sensing signal for a sensing element formed by a first of the proximity-sensing pairs of electrodes; and generate an LGM-corrected transcapacitance sensing signal by correcting the first transcapacitance sensing signal using the first LGM term.

In general, in one aspect, one or more embodiments relate to a method of capacitive sensing, the method operating on a plurality of sensor electrodes disposed in a sensor electrode pattern, wherein, when under a low ground mass (LGM) condition: proximity-sensing pairs of electrodes formed by a first selective pairing of the plurality of sensor electrodes have an increased sensitivity to a presence of an input object in comparison to LGM-sensitive pairs of electrodes formed by a second selective pairing of the plurality of sensor electrodes that are primarily sensitive to the LGM condition; the method comprising, while under the LGM condition: determining a first LGM term using a mutual capacitance sensing with a first of the LGM-sensitive pairs of electrodes; obtaining a first transcapacitance sensing signal for a sensing element formed by a first of the proximity-sensing pairs of electrodes; and generating an LGM-corrected transcapacitance sensing signal by correcting the first transcapacitance sensing signal using the first LGM term.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods for touch sensing in presence of low ground mass (LGM) conditions. Generally, a capacitive input device may suffer from LGM artifacts in a touch sensing response if the input device has a small self-capacitance, if it is poorly grounded and/or if its stack-up is sufficiently thin. In such cases, the trans-capacitive touch signals develop a dip, which intensifies with larger finger size. If left uncorrected, this may cause wrong position reporting and/or phantom fingers in the touch detection. In one or more embodiments, multiple different sensing operations may be performed by the input device. One or more sensing operations may be performed to identify an LGM component. Another sensing operation may be used to obtain a touch signal, in presence of the LGM condition. The identified LGM component may be removed from the touch signal to obtain a touch output that is not impaired by the LGM condition. Each of these aspects is discussed in detail below.

Figure 1:
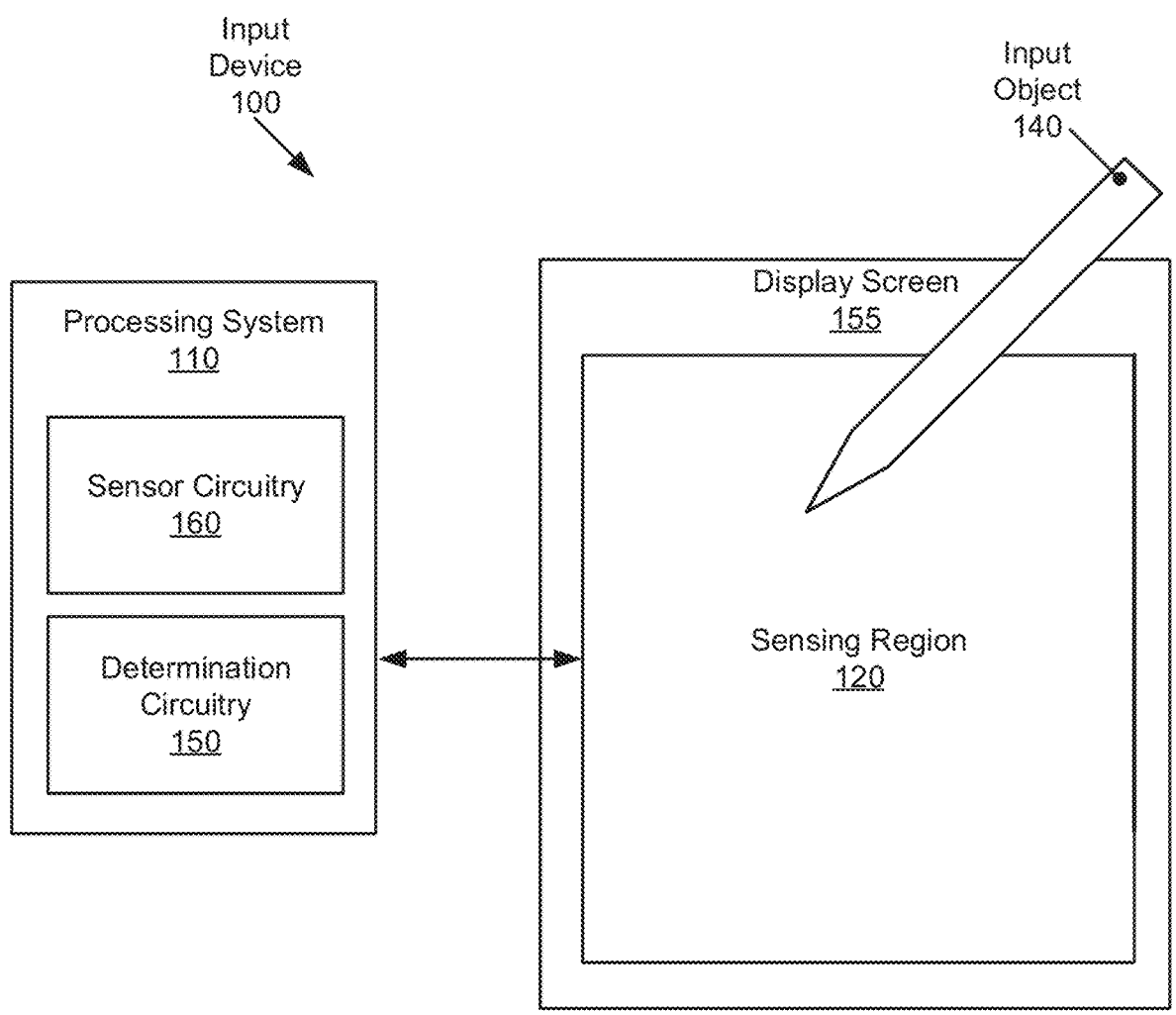
FIG. 1 shows a block diagram of an input device, in accordance with one or more embodiments.

FIG. 1 is a block diagram of an example of an input device (100), in accordance with one or more embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), gaming devices, automotive infotainment systems, etc.

In FIG. 1, the input device (100) is shown as a proximity sensor device (e.g., "touchpad" or a "touch sensor device") configured to sense input provided by one or more input objects (140) in a sensing region (120). Example input objects include styli, an active pen, and fingers. Further, which particular input objects are in the sensing region may change over the course of one or more gestures.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As a non-limiting example, the input device (100) may use capacitive techniques.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", Tx) and one or more receiver sensor electrodes (also "receiver electrodes" or "receiver", Rx). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments, the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). One or more of the steps described in the flowcharts of FIG. 7, FIG. 8, FIG. 9, and FIG. 10 may be performed by the processing system (110). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like.

The processing system (110) may be implemented as a set of modules that handle different functions of the processing system (110). For example, the processing system (110) may include determination circuity (150) to determine when at least one input object is in a sensing region, determine signal to noise ratio, determine positional information of an input object, identify a gesture, determine an action to perform based on the gesture, a combination of gestures or other information, and/or perform other operations. The modules may include hardware and/or software which may execute on a processor.

The sensor circuitry (160) may include functionality to drive the sensing elements to transmit transmitter signals and receive the resulting signals. For example, the sensor circuitry (160) may include sensory circuitry that is coupled to the sensing elements. The sensor circuitry (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows determination circuitry (150) and a sensor circuitry (160), alternative or additional modules may exist in accordance with one or more embodiments. Example alternative or additional modules include hardware operation modules for operating hardware such as sensor electrodes and display screens (155), data processing modules for processing data such as sensor signals and positional information, reporting modules for reporting information, and identification modules configured to identify gestures, such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), microLED, liquid crystal display (LCD), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the disclosure. For example, various components may be combined to create a single component. As another example, the functionality performed by a single component may be performed by two or more components.

Now referring to FIG. 2A, FIG. 2B, FIG. 3, FIG. 4, and FIG. 5, various sensor patterns, in accordance with one or more embodiments, are shown. Each of the sensor patterns may be used for a capacitive touch sensing in presence of LGM conditions. Accordingly, each of the sensor patterns may be used in conjunction with the methods of FIG. 7, FIG. 8, FIG. 9, and FIG. 10.

Figure 2A:
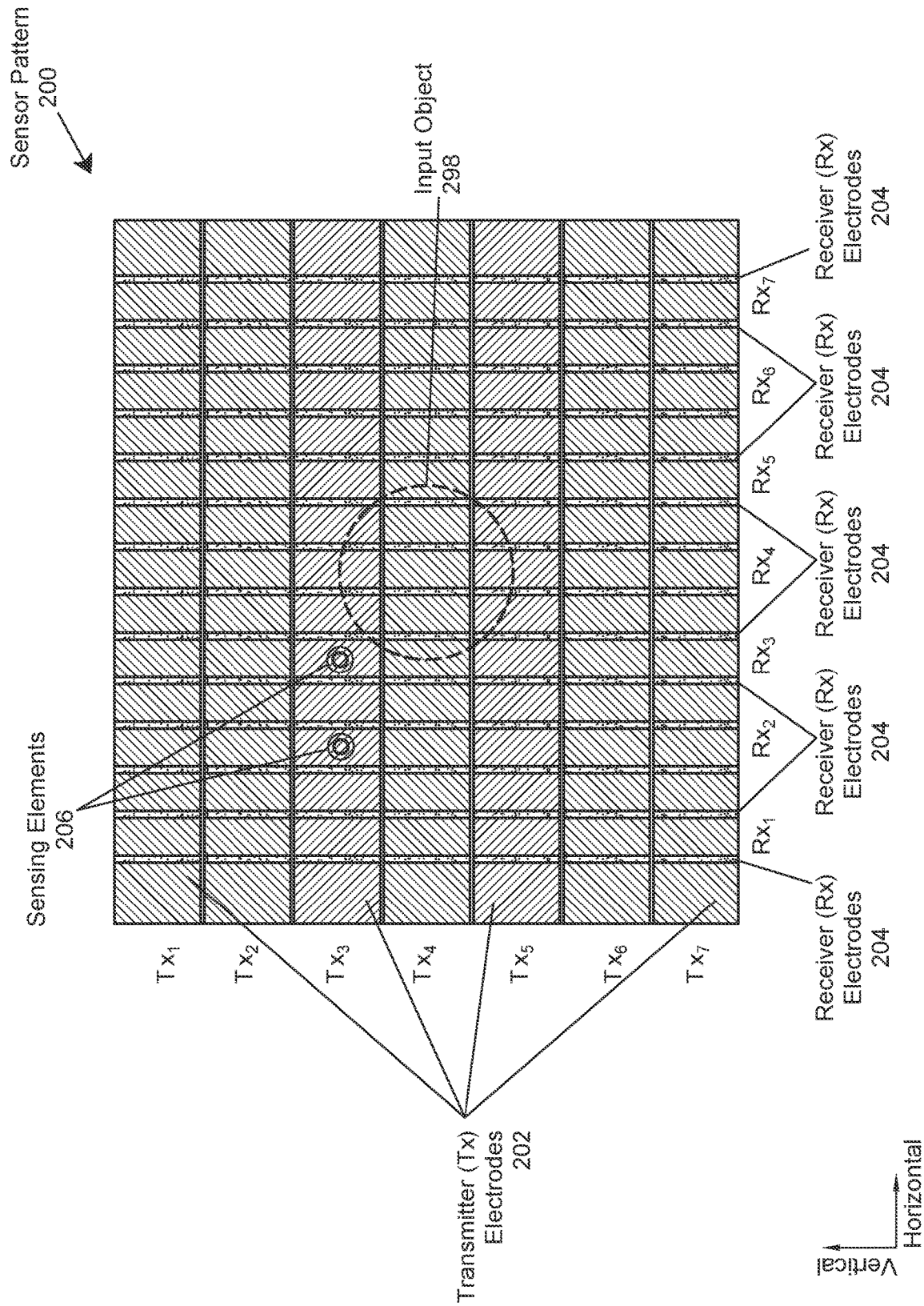
FIG. 2A and FIG. 2B show sensor patterns, in accordance with one or more embodiments.

Turning to FIG. 2A, a sensor pattern (200) is shown. The sensor pattern includes rows of transmitter electrodes Tx1-Tx7 (202) and columns of receiver electrodes Rx1-Rx7 (204). In the sensor pattern (200), the Tx electrodes have a rectangular shape. The Rx electrodes include two separate, thinner electrode elements instead of a single wider electrode element. The use of two thinner Rx electrode elements per Rx electrode results in a reduced capacitive coupling to an input object (298), e.g., a finger, thereby providing superior LGM characteristics. In other embodiments, the Rx electrodes may consist of single wider electrode elements, analogous to the Tx electrodes. Generally, Tx and Rx electrodes of any shape and with any number of prongs may be used.

The Tx (202) and/or Rx (204) electrodes may be used in capacitance sensing (e.g., absolute capacitance sensing, mutual capacitance sensing, etc.).

In one or more embodiments, the Tx electrodes (202) and the Rx electrodes (204), together, implement mutual capacitance or transcapacitance sensing. At the intersection of a Tx (202) and a Rx (204) electrode, a localized capacitive coupling is formed between a portion of the Tx electrode (202) and the Rx electrode (204). The region of this localized capacitive coupling may be termed a "capacitive pixel," or also referred to herein as the sensing element (206). A transcapacitance Ct is associated with the sensing element (206). When an input object (298) approaches the sensing element (206), the transcapacitance Ct may change by an amount ΔCt. A presence or absence of the input object (298) may thus be detected by monitoring ΔCt. ΔCt may be measured by driving a waveform onto the Tx electrode (202) and receiving a resulting signal from the Rx electrode (204). The resulting signal is a function of the waveform and ΔCt due to the presence of an input object (298). Alternatively, a transcapacitance sensing may also be performed between two Tx electrodes (202) or between two Rx electrodes (204). In other words, a mutual capacitance between non-crossing electrodes may be obtained between two Tx electrodes (202) or between two Rx electrodes (204). A ΔCt may be obtained for multiple sensing elements to generate a capacitive image, e.g., spanning the entire sensing region (120).

In one or more embodiments, the Rx electrodes (202) are operated to perform absolute capacitance sensing independent of the Tx electrodes (204). In one or more embodiments, the Tx electrodes (202) are operated to perform absolute capacitance sensing independent of the receiver electrodes (204).

The use of the sensor pattern (200) to detect a touch is described below with reference to the flowcharts of FIG. 7, FIG. 8, FIG. 9, and FIG. 10.

Figure 2B:
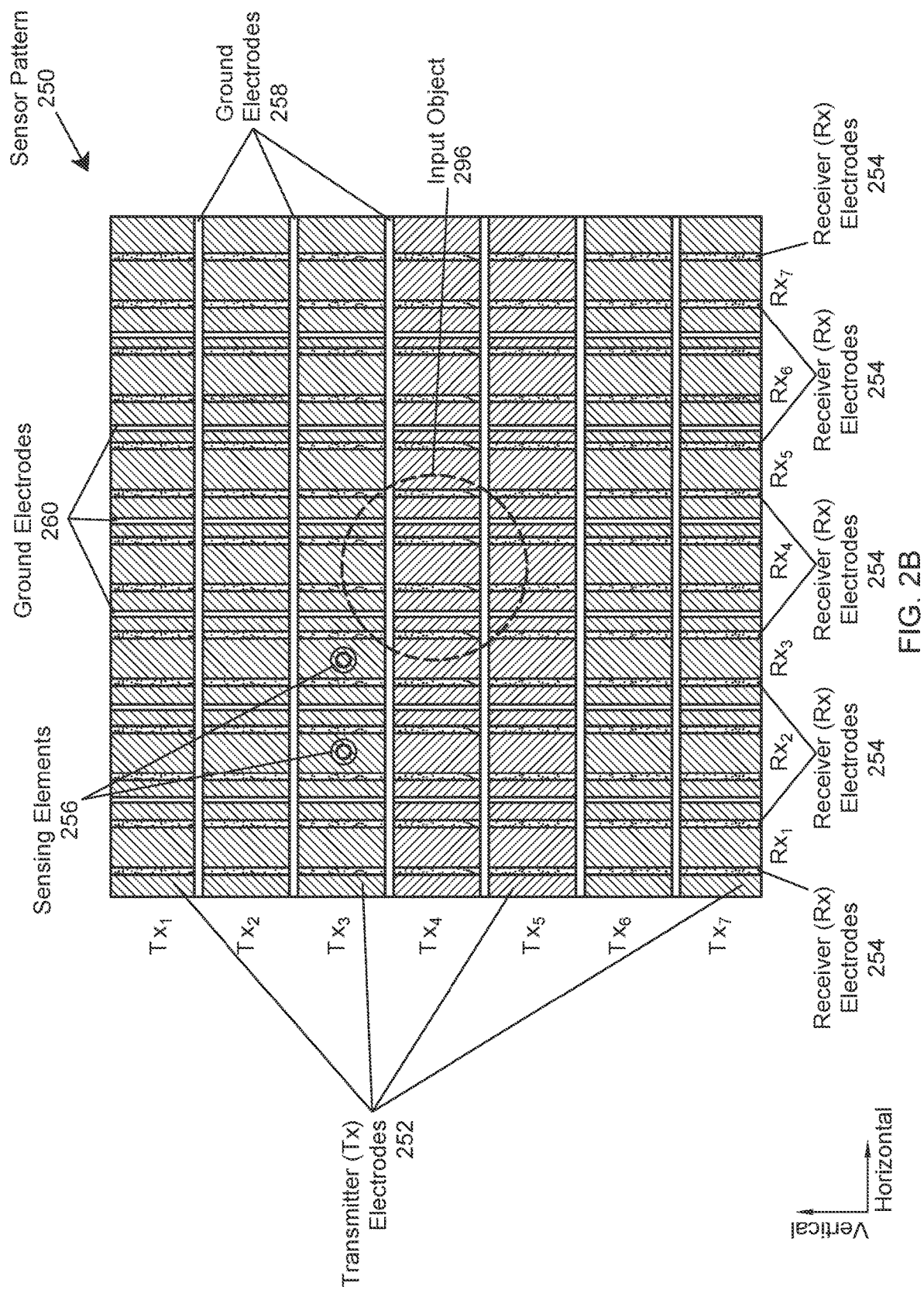

Turning to FIG. 2B, a sensor pattern (250) is shown. The sensor pattern (250) is substantially similar to the sensor pattern (200), with the addition of ground and/or guard electrodes (258) between the Tx electrodes (252), and ground/guard electrodes (260) between the Rx electrodes (254).

The use of the sensor pattern (250) to detect a touch is described below with reference to the flowcharts of FIG. 7, FIG. 8, FIG. 9, and FIG. 10.

Figure 3:
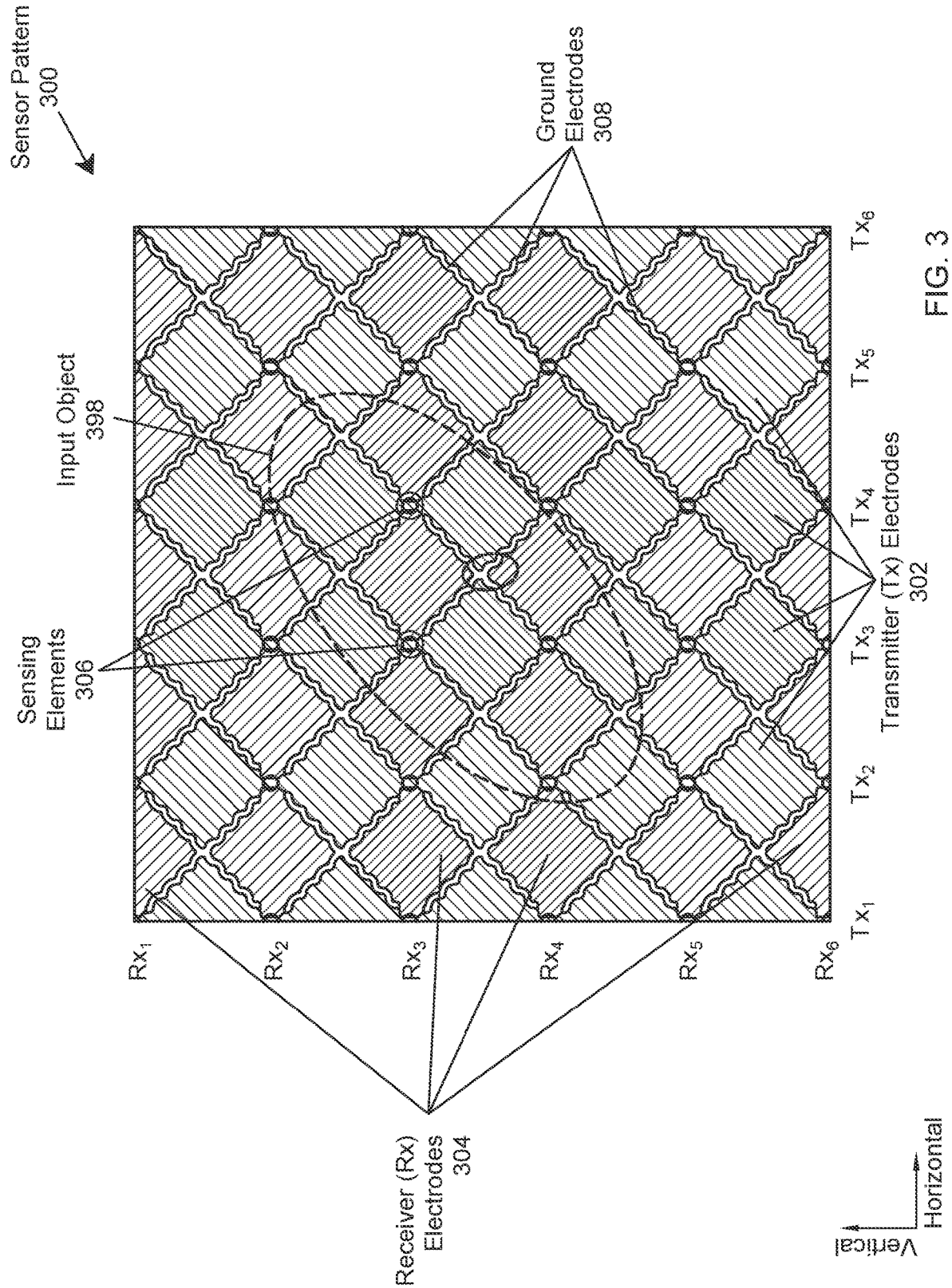
FIG. 3 shows a sensor pattern, in accordance with one or more embodiments.

Turning to FIG. 3, a sensor pattern (300) is shown. The sensor pattern includes columns of diamond-shaped transmitter electrodes Tx1-Tx6 (302) and rows of receiver electrodes Rx1-Rx6 (304).

The Tx (302) and/or Rx (304) electrodes may be used in capacitance sensing (e.g., absolute capacitance sensing, mutual capacitance sensing, etc.), analogous to the capacitance sensing described with reference to FIG. 2A. At the intersections of Tx (302) and Rx (304) electrodes, localized capacitive couplings are formed between portions of the Tx electrodes (302) and the Rx electrodes (304), providing the sensing elements (306) used for detecting an input object (398). The sensor pattern (300) may further include ground electrodes (308), separating the diamond shaped patches of Tx (302) and Rx (304) electrodes.

The use of the sensor pattern (300) to detect a touch is described below with reference to the flowcharts of FIG. 7, FIG. 8, FIG. 9, and FIG. 10.

Figure 4:
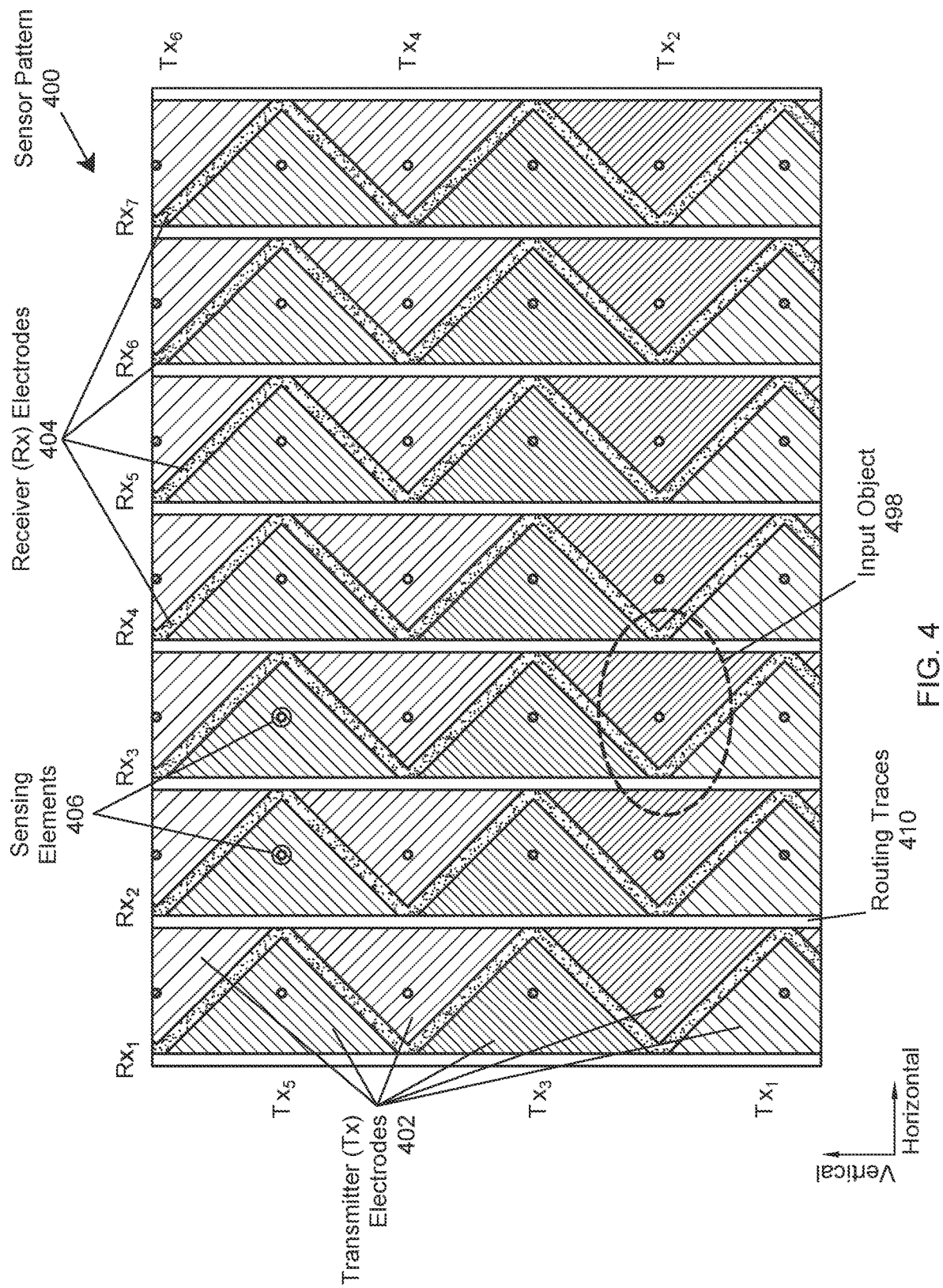
FIG. 4 shows a sensor pattern, in accordance with one or more embodiments.

Turning to FIG. 4, a sensor pattern (400) is shown. The sensor pattern includes columns of electrodes, including triangular transmitter electrodes Tx1-Tx6 (402) and receiver electrodes Rx1-Rx7 (404) following the outlines of the triangles. The sensor pattern (400) is a representative example of a "single layer design," where the routing of the Tx electrodes is going through the 2D area, rather than along the borderline of the 2D area as in more traditional sensor designs. In the sensor pattern (400), routing traces (410) associated with the Tx electrodes (402) are routed in parallel bundles to exit at the top or bottom edge of the sensor pattern. No jumpers on the Tx and/or Rx electrodes may be needed. Further, no separation of layers for the Tx and Rx electrodes may be needed.

The Tx (402) and/or Rx (404) electrodes may be used in a capacitance sensing (e.g., absolute capacitance sensing, mutual capacitance sensing, etc.), analogous to the capacitance sensing described with reference to FIG. 2A. At the intersections of Tx (402) and a Rx (404) electrodes, localized capacitive couplings are formed between portions of the Tx electrodes (402) and the Rx electrodes (404), providing the sensing elements (406) used for detecting an input object (498).

The use of the sensor pattern (400) to detect a touch is described below with reference to the flowcharts of FIG. 7, FIG. 8, FIG. 9, and FIG. 10.

Figure 5:
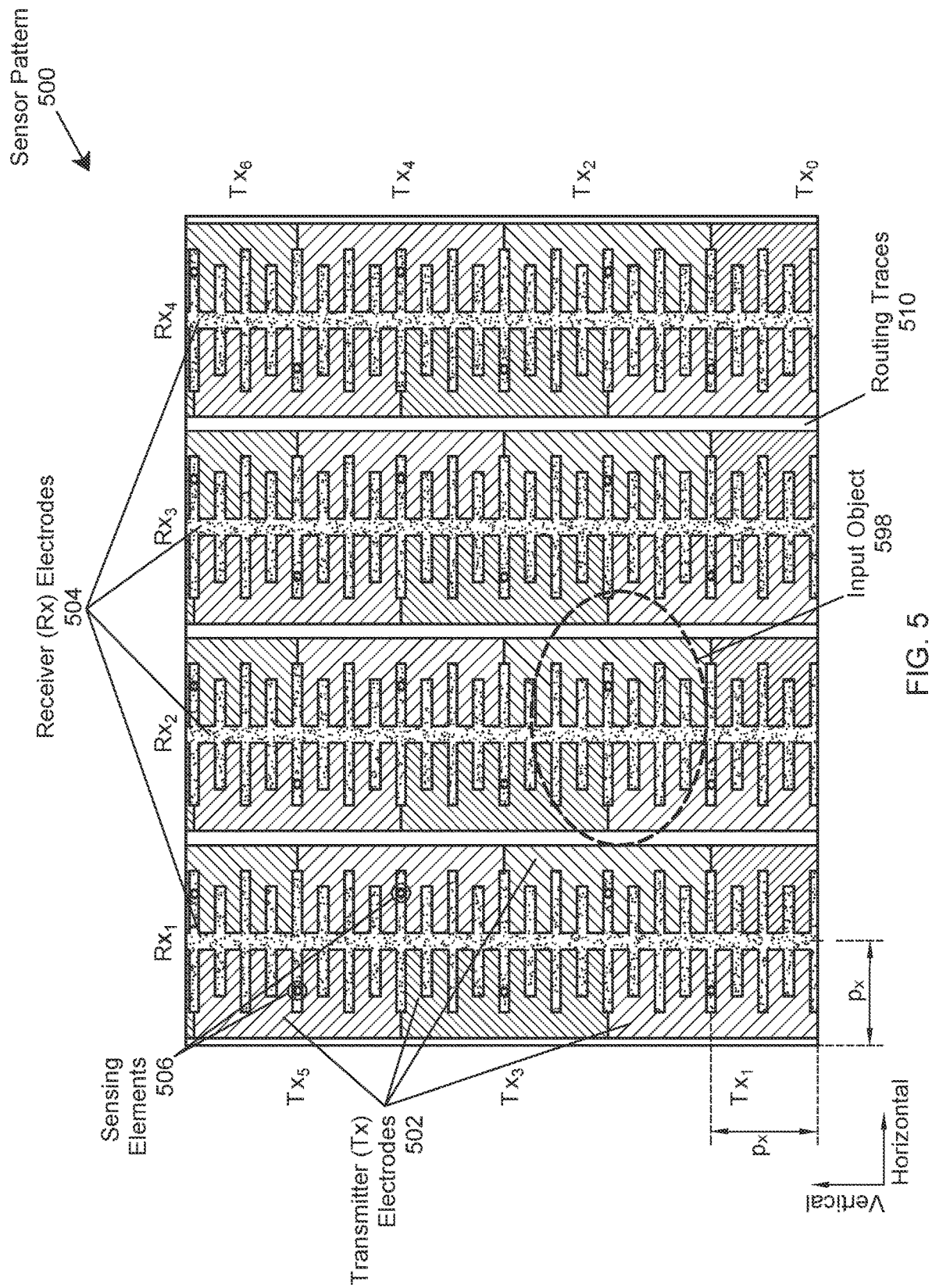
FIG. 5 shows a sensor pattern, in accordance with one or more embodiments.

Turning to FIG. 5, yet another "single layer" sensor pattern (500) is shown.

The sensor pattern includes columns of electrodes, including substantially elongated receiver electrodes Rx1-Rx4 (504), and transmitter electrodes Tx0-Tx6 (502) disposed adjacent to the Rx electrodes (504). Routing traces (510) associated with the Tx electrodes (502) are routed in parallel bundles within a gap between the Tx electrodes (502) to exit at the top or bottom edge of the sensor pattern.

The Tx (502) and/or Rx (504) electrodes may be used in capacitance sensing (e.g., absolute capacitance sensing, mutual capacitance sensing, etc.), analogous to the capacitance sensing described with reference to FIG. 2A. At the intersections of Tx (502) and a Rx (504) electrodes, localized capacitive couplings are formed between portions of the Tx electrodes (502) and the Rx electrodes (504), providing the sensing elements (506) used for detecting an input object (598).

The use of the sensor pattern (500) to detect a touch is described below with reference to the flowcharts of FIG. 7, FIG. 8, FIG. 9, and FIG. 10.

In various embodiments, the ground condition of the input device corresponds to free-space capacitive coupling in series between the input device-universe and the input object-universe. In various embodiments, when the coupling between the input device and the universe (free-space coupling coefficient) is relatively small, the device may be considered to be in a low ground mass (LGM) state. This may occur, for example, when the input device has a small self-capacitance, if it is poorly grounded, and/or if the stack-up of the proximity/touch sensor device in the input device is sufficiently thin. Whether an LGM condition is present may depend on additional circumstances such as how large the input device is (which may affect the self capacitance), and how big the touching finger(s) is(are), etc. In other words, even for a fixed sensor design, the LGM behavior can change in a fraction of seconds, depending on what the user is doing with the input device. However, when the coupling between the input device and the universe is substantially larger, the device may be considered to be operating in a good ground (GG) mass state. Further, when the coupling between an input object and system ground of the input device is substantially large, the input device may be in a good ground mass condition.

An LGM correction may be applied when an LGM condition is detected. When an LGM is not detected, the LGM correction is not applied because the determined correction term is negligible, in accordance with one or more embodiments. When the LGM correction is not applied, the sensing device may operate under a normal operating mode.

The LGM correction for capacitive imaging sensors, as subsequently described, is applicable to many existing sensor patterns, including the sensor patterns of FIGS. 2A, 2B, 3, 4, and 5. No particular modifications to the sensor patterns may be necessary, if certain basic requirements are met, as discussed in reference to FIG. 6.

Figure 6:
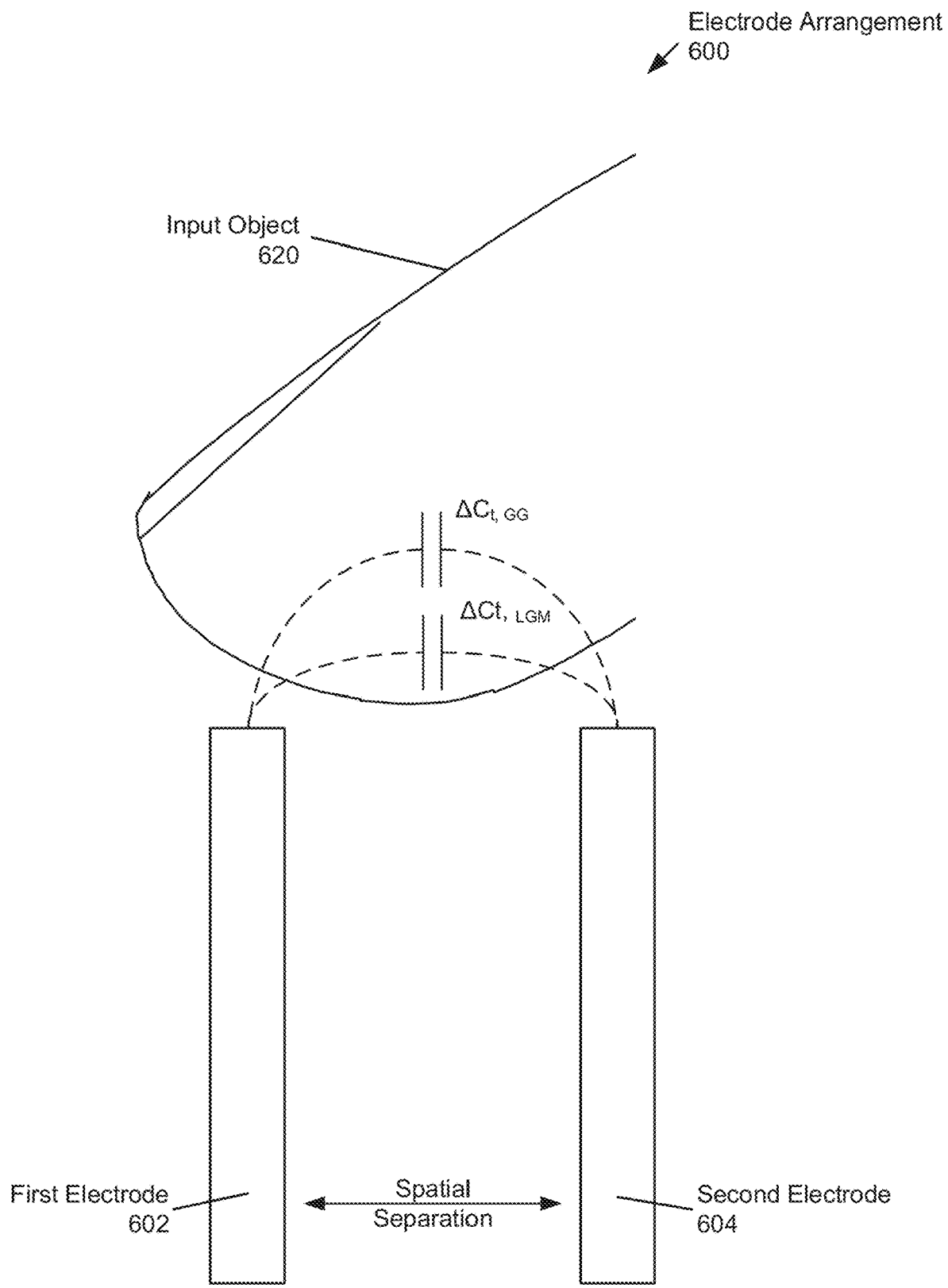
FIG. 6 schematically shows an electrode arrangement, in accordance with one or more embodiments.

FIG. 6 schematically shows an electrode arrangement, in accordance with one or more embodiments.

In order to perform an LGM correction, signals obtained from a first set of electrodes, combined to form an LGM-sensitive pair of electrodes, may be used to obtain an LGM correction. The obtained LGM correction term may then be applied to a measurement obtained from a second set of electrodes to obtain a touch signal that is corrected for the LGM condition.

For the following discussion, assume that an LGM condition is present. Capacitances between a first electrode (602) and a second electrode (604), forming the LGM-sensitive pair of electrodes, in presence of an input object (620), e.g., a finger, are subsequently discussed. In a first scenario, assume that the first and second electrodes (602, 604) are selected to allow identification of a capacitance that is associated with the LGM condition. A change in a measured capacitance, $\Delta C_{t,LGM}$, may be obtained, e.g., by measuring charge transfer between the two electrodes as the input object appears in proximity of the first and second electrode (602, 604). $\Delta C_{t,LGM}$ may be separated into a component that exists under good ground (GG) conditions, $\Delta C_{t,GG}$, and a component that is directly associated with the parasitic LGM term—$C_{LGM}$. Under certain conditions (through proper selection of the first and second electrodes (602, 604)), $\Delta C_{t,GG}$ may become small, i.e., negligible, such that $\Delta C_{t,LGM}$ is directly indicative of $C_{LGM}$, which may then be used in another measurement (e.g., when sensing touch) to compensate that other measurement for the LGM conditions.

Accordingly, the first and second electrodes (602, 604) may be selected to cause the trans-capacitive signal, $\Delta C_{t,GG}$, to vanish and to cause the parasitic LGM contribution, $C_{LGM}$, not to vanish. This may be accomplished by increasing the spatial separation between the first and second electrodes (602, 604), within certain limits Increasing the spatial separation reduces the capacitance between the first and the second electrode that would exist under GG conditions, whereas the capacitance resulting from the LGM conditions remains mostly unaffected by the increased spatial separation within certain limits The spatial separation may further be limited by the size of the input object. Appropriate spatial separations are discussed below in reference to FIGS. 7, 8, and 9. Other methods may be used to reduce the capacitance between the first and the second electrode that would exist under GG conditions. For example, a ground electrode or an actively driven electrode may be placed between the first and the second electrodes (602, 604) to prevent or reduce the exchange of electric charge between the first and second electrodes (602, 604). The use of a ground electrode or an actively driven electrode may thus enable a reduced electrode separation, while still reduces the capacitance between the first and the second electrodes that would exist under GG conditions. Using these approaches for selecting the first and second electrode (602, 604), the capacitance between the first and the second electrode that would exist under GG conditions may be effectively reduced to a negligible value. As a result, a capacitance measurement (based on a measured charge transfer) between the first and the second electrodes (602, 604) is directly indicative of the LGM contribution, $C_{LGM}$. In general, a larger capacitance measurement suggests a worse ground mass state of the input device.

Now referring to capacitance measurements performed to detect touch, the first and the second electrodes may be selected to form a proximity-sensing pair of electrodes. Specifically, the first and second electrodes (602, 604), in this case, may be selected to maximize the trans-capacitive signal, $\Delta C_{t,GG}$, which may be accomplished by a reduced separation of the first and second electrodes (602, 604). While the reduced separation may not substantially affect the LGM contribution, $\Delta C_{t,LGM}$, between the first and the second electrodes (602, 604), the LGM contribution may be removed from the measurement once it has been identified, as previously described.

In one or more embodiments, various sensor patterns, such as the sensor patterns of FIGS. 2A, 2B, 3, 4, and 5, are in a configuration that allow selection of suitable first and second electrodes to identify $C_{LGM}$ (LGM-sensitive pair of electrodes), and to perform the capacitance measurement for touch sensing (proximity-sensing pair of electrodes). Consider, for example, the pattern (200), shown in FIG. 2A. The sensor pattern (200) includes transmitter electrodes (202) and receiver electrodes (204). Different transmitter electrodes (202) and/or receiver electrodes (204) may be selectively paired to identify $C_{LGM}$ and to perform the capacitance measurement for touch sensing. For example, an adjacent pair of receiver electrodes (204) or an adjacent pair of transmitter electrodes (202) may be used for the identification of $C_{LGM}$. The electrode separation in these pairs of adjacent, non-intersecting electrodes may be sufficient to effectively eliminate $\Delta C_{t,GG}$. Many different LGM-sensitive pairs of electrodes may be formed from the transmitter electrodes (202) and/or the receiver electrodes (204) in the sensor pattern (200). Further, a transmitter electrode (202) and a receiver electrode (204) may be selectively paired to perform the capacitance measurement for the touch sensing. The electrode separation at the intersection of the transmitter electrode (202) and the receiver electrode (204) is minimal, thereby maximizing the trans-capacitive signal, $\Delta C_{t,GG}$. Many different proximity-sensing pairs of electrodes may be formed from the transmitter electrodes (202) and/or the receiver electrodes (204) in the sensor pattern (200). The proximity-sensing pairs of electrodes have an increased sensitivity to the presence of an input object, in comparison to the LGM-sensitive pairs of electrodes. Accordingly, the same electrodes of the sensor pattern (200) may be paired differently to obtain either proximity-sensing pairs of electrodes or LGM-sensitive pairs of electrodes, without requiring specialized electrodes that are limited to being exclusively part of either proximity-sensing pairs of electrodes or LGM-sensitive pairs of electrodes.

FIG. 7, FIG. 8, FIG. 9, and FIG. 10 show flowcharts in accordance with one or more embodiments. While the various steps in the flowcharts are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 7, FIG. 8, FIG. 9, and FIG. 10.

Figure 7:
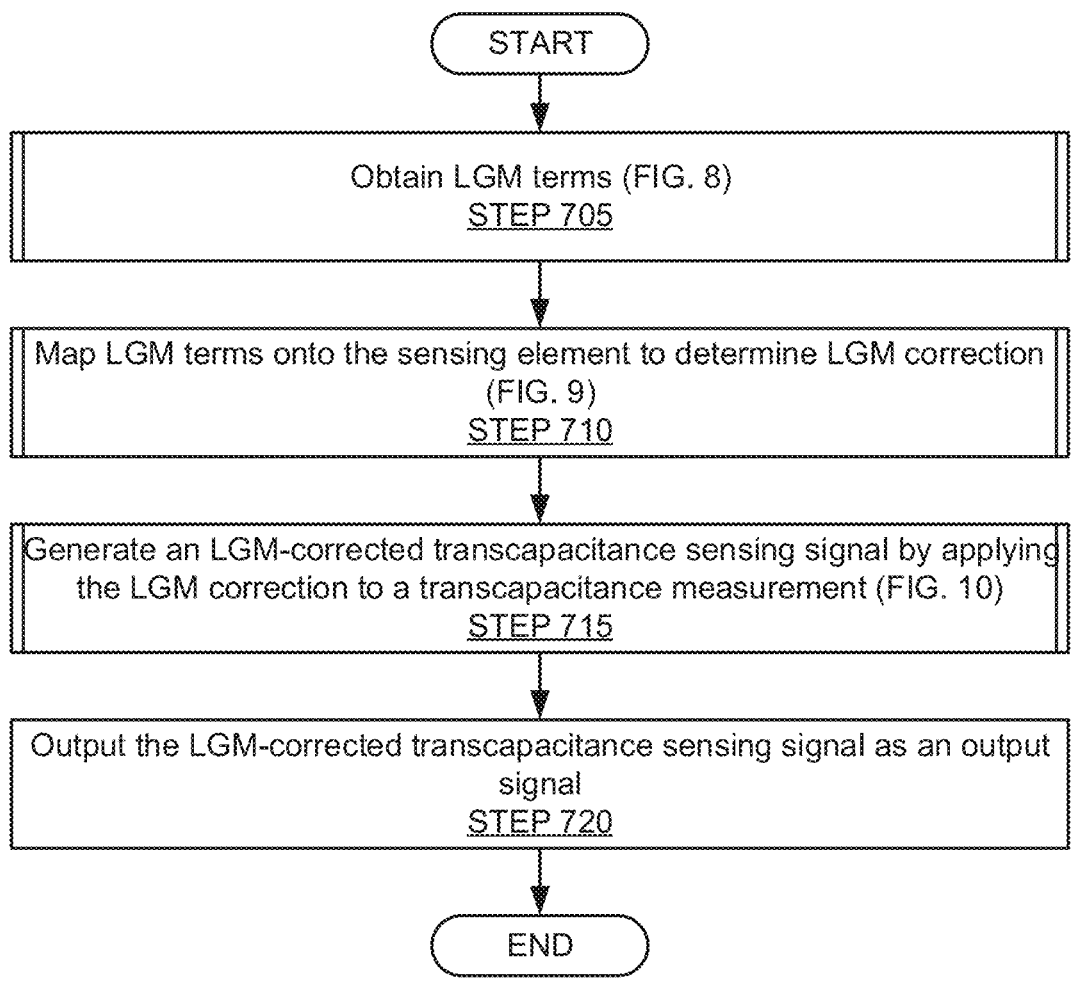
FIG. 7 shows a flowchart, in accordance with one or more embodiments.

Turning to FIG. 7, a flowchart in accordance with one or more embodiments is shown. The flowchart of FIG. 7 depicts a method for operating an input device.

One or more of the steps in FIG. 7 may be performed by the components of the input device (100). The described method may enable a capacitive touch sensing in presence of low ground mass (LGM) conditions. Broadly speaking, the method identifies an LGM term and uses the LGM term to correct a transcapacitive sensing obtained under LGM conditions for the LGM conditions. In one or more embodiments, no electrodes that are exclusively dedicated to the determination of the LGM term are required, unlike other approaches that may rely on a specialized sensor pattern with electrodes that are exclusively dedicated to the determination of the LGM term. In other words, embodiments of the disclosure are agnostic to the electrode pattern. In one or more embodiments, the LGM term is determined based on measurements performed using LGM-sensitive pair of electrodes. The LGM-sensitive pair of electrodes may be selected such that a transcapacitance term under good ground conditions essentially vanishes, whereas a transcapacitance under LGM conditions remains. The LGM-sensitive pair of electrodes may consist of non-intersecting (non-crossing) electrodes, e.g., parallel electrodes or any other combinations of electrodes for which the transcapacitance term under good ground conditions essentially vanishes, whereas a transcapacitance under LGM conditions remains. A transcapacitance measurement performed using the LGM-sensitive pair of electrodes may be dominated by a parasitic LGM term. The parasitic LGM term, identified using the LGM-sensitive pair of electrodes, may be used to correct a transcapacitance sensing signal obtained for a sensing element of an electrode pattern. The sensing element may be formed by a proximity-sensing pair of electrodes. In comparison to the LGM-sensing pair of electrodes, whose transcapacitance is not or only minimally affected by the presence of an input object (under good ground conditions), the transacapacitance of the proximity-sensing pair of electrodes is sensitive to the presence of an input object. However, the transcapacitance of the proximity-sensing pair of electrodes may also be sensitive to LGM conditions. To correct for an LGM condition, a transcapacitance sensing signal obtained from a proximity-sensing pair of electrodes may be corrected using the previously identified parasitic LGM term. While the subsequently described steps are described for a single sensing element, the steps may be performed for multiple or all sensing elements in a sensing pattern, to obtain an image frame. Further, the operations may be repeated over time, to monitor touch over time.

The following paragraphs describe one method for obtaining an LGM-corrected transcapacitance sensing signal. Various steps may be performed in different manners, without departing from the disclosure.

For simplicity, the following discussion is based on the sensor pattern (200) of FIG. 2A. Specifically, now referring to the sensing element formed at the intersection of $Tx_4$ and $Rx_4$, embodiments of the disclosure obtain a change in transcapacitance $\Delta C_t$ in presence of LGM conditions. As a result of the subsequently described methods, the $\Delta C_t$ is free of LGM artifacts, through a superposition of the transcapacitive measurement and the LGM term. Specifically, for the intersection $Tx_4$ and $Rx_4$, denoted by $\Delta C_{t,GG}^{Rx_4Tx_4}$, the transcapacitance $\Delta C_t$, computed to eliminate possible LGM artifacts, is as it would be obtained under good ground (GG) conditions. By $\Delta C_{t,LGM}^{Rx_4Tx_4}$, we denote the actual measurement performed at the intersection of $Tx_4$ and $Rx_4$. The term includes possible LGM artifacts and in general may not be a reliable indicator of the presence or absence of touch. $C_{LGM}^{Rx_4Tx_4}$ denotes a corrective term that cancels the LGM artifacts in $\Delta C_{LGM}^{Rx_4Tx_4}$.

The corrective term may be obtained by performing one or more additional sensing operations. Referring to the above example, the measurement $\Delta C_{t,LGM}^{Rx_4Tx_4}$ is obtained, and in addition, the measurements $\Delta C_{t,LGM}^{Tx_3Tx_5}$ and $\Delta C_{t,LGM}^{Rx_3Rx_5}$ are obtained. As discussed in detail below, these terms allow computation of $C_{LGM}^{Rx_4Tx_4}$ to cancel the LGM artifacts in $\Delta C_{t,LGM}^{Rx_4Tx_4}$. Additional details regarding transcapacitance sensing under LGM conditions are provided in U.S. Pat. No. 9,791,970, the entire disclosure of which is hereby expressly incorporated by reference herein.

Accordingly, the described method includes three main steps:

In Step 705, one or more LGM terms are determined. In the above example, the LGM terms are based on $\Delta C_{t,LGM}^{Tx_3Tx_5}$ and $\Delta C_{t,LGM}^{Rx_3Rx_5}$ details are described below with reference to the flowchart of FIG. 8.

In Step 710, the LGM terms are mapped to the sensing element (a particular combination of Tx and Rx electrodes) to obtain an LGM correction. In the above example, the term $C_{LGM}^{Rx_4Tx_4}$ is obtained. The details are described below with reference to the flowchart of FIG. 9.

In Step 715, the LGM correction is applied to the transcapacitance measurement at the sensing element, to obtain an LGM-corrected transcapacitance signal, $\Delta C_{t,GG}^{Rx_4Tx_4}$, that is free of LGM artifacts. In the above example, the transcapacitance measurement is $\Delta C_{t,LGM}^{Rx_4Tx_4}$, and the LGM correction is $C_{LGM}^{Rx_4Tx_4}$. The details are described below with reference to the flowchart of FIG. 10.

Each of Steps 705, 710, and 715 is described based on one specific approach for performing the step. Nevertheless, alternative approaches for performing each of these steps may exist. Various examples are provided throughout the discussion.

In Step 720, the LGM-corrected transcapacitance signal is outputted as an output signal to allow downstream operations that rely on a detection of a touch.

While the above method is described with reference to the sensor pattern (200) of FIG. 2, the method is equally applicable to other sensor patterns.

Consider, for example, the sensor pattern (300) of FIG. 3. Pairs of parallel electrodes (pairs ($Rx_3$, $Rx_4$) and ($Tx_3$, $Tx_4$)) include direct neighbors. The gaps between Tx and Rx electrodes for the diamond pattern may be closed in or filled with floating/ground/guard electrodes if there is a significant gap. Accordingly, the mutual capacitance between these non-crossing electrodes, $\Delta C_t$, may be minimal or non-existent, if appropriate dimensions of said design elements are separating the two parallel running neighboring electrodes. Consider the region indicated by the dashed oval in FIG. 3. In the region, $\Delta C_t$ may vanish (or almost vanish) for the pairs ($Rx_3$, $Rx_4$) and ($Tx_3$, $Tx_4$). In this configuration even in presence of small input objects, the parasitic LGM terms $C_{LGM}^{Rx_3Rx_4}$ and $C_{LGM}^{Tx_3Tx_4}$ may be reliably identified. For larger input objects (such as shown in FIG. 3 for example), pairs of parallel electrodes (pairs ($Rx_3$, $Rx_5$) and ($Tx_3$, $Tx_5$)) that are not direct neighbors may be more appropriate to use instead. An appropriate noise floor threshold for $C_{FTx}$ and $C_{FRx}$ can be used to determine whether the parasitic term measurement is admissible or not. If the approach used for large input objects fails, based on the noise floor test, the approach proposed for small input objects may be used.

Now referring to the sensor pattern (400, 500) in FIG. 4 and FIG. 5, respectively, for the Rx electrodes the adjacent neighbors may be used. Indeed, since there is a sufficiently high separation between the adjacent Rx-electrodes in these type of sensors, the mutual capacitance between non-crossing electrodes is vanishing under a good grounded condition. For the Tx electrodes, two options exist: (1) $Tx_1$ and $Tx_3$ may be used. In this case, for the pattern of FIG. 5 a suitable extension of the Rx pattern between $Tx_1$ and $Tx_3$ may be needed to act as a divider to ensure that $\Delta C_{t,GG}^{Tx_1 Tx_3} \approx 0$. (2) $Tx_1$, $Tx_2$ may be used. However, in this case, the design of the sensor pattern should ensure that the interaction over the routing traces (410, 510) still yields $\Delta C_{t,GG}^{Tx_1 Tx_2} \approx 0$.

Generalizing beyond particular sensor patterns, the method is applicable to sensor patterns ideally with the properties $\Delta C_{t,GG}^{Tx_k Tx_{k+1}} \approx 0$ and $\Delta c_{t,GG}^{Rx_\ell Rx_{\ell+1}} \approx 0$. The method may, however, also be used with sensor patterns with the properties $\Delta C_{t,GG}^{Tx_k Tx_{k+2}} \approx 0$ and $\Delta c_{t,GG}^{Rx_\ell Rx_{\ell+2}} \approx 0$, which most sensor patterns satisfy. More generally, a necessary condition for a suitable pair of parallel electrodes is $\Delta C_{t,GG}^{Tx_k Tx_{k+m}} \approx 0$ for a suitable $m \neq 0$, and $\Delta_{t,GG}^{Rx_\ell Rx_{\ell+n}} \approx 0$ for a suitable $n \neq 0$.

Figure 8:
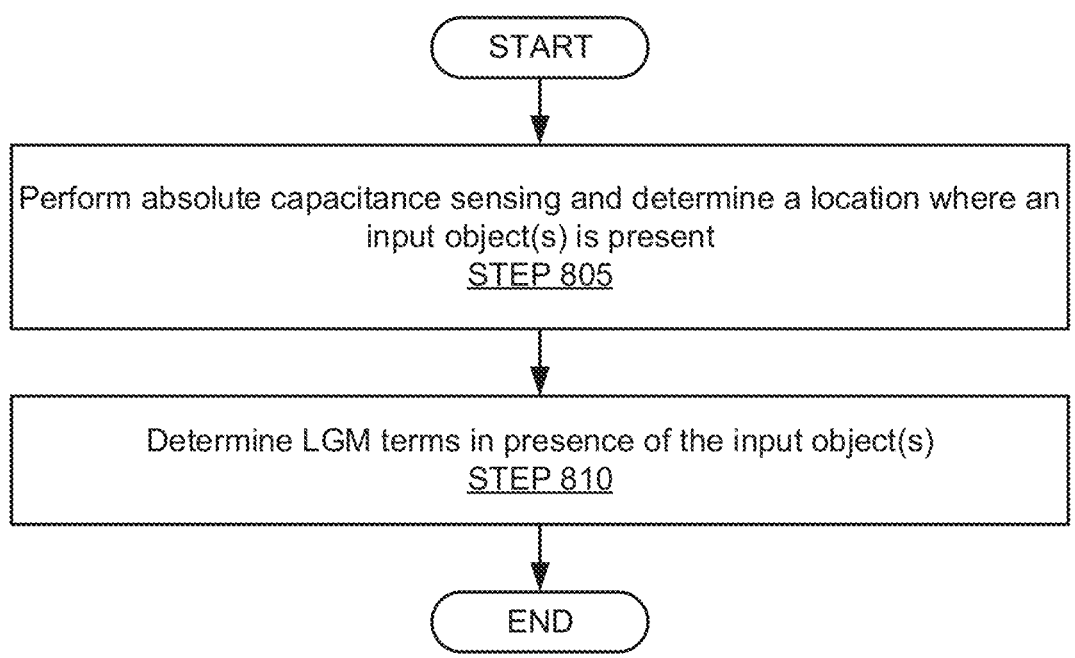
FIG. 8 shows a flowchart, in accordance with one or more embodiments.

Turning to FIG. 8, a method for obtaining one or more LGM terms is described. The method may be performed for any sensing pattern, including the sensing patterns of FIG. 2A, FIG. 2B, FIG. 3, FIG. 4, and FIG. 5. For simplicity, some of the subsequently described steps are specific to obtaining $\Delta C_{t,GG}^{Rx_4 Tx_4}$, followed by a generalization.

In Step 805, an absolute capacitance sensing is performed to determine the regions where an input object may be present. Appropriate threshold settings for x- and y-profiles (e.g., along the horizontal and vertical directions of the sensor patterns shown in FIGS. 2A, 2B, 3, 4, and 5) may be used to filter out the noise floor. On each axis, for all the non-vanishing profile regions, the projected object which has the most non-vanishing profile values may be selected. Out of that specific region for each axis, the location with the maximum value may be selected. For the discussion of the following steps, assume that the location at the intersection of $Tx_4$ and $Rx_4$ is selected. Other types of sensing may be performed to determine the regions where an input object may be present. For example, a transcapacitance sensing or combined absolute capacitance and transcapacitance sensing may be performed to obtain x- and y-profiles.

In Step 810, and now referring to FIG. 2A, $\Delta C_{t,LGM}^{Tx_3 Tx_5}$ and $\Delta C_{t,LGM}^{Rx_3 Rx_5}$ are measured. These mutual capacitance measurements between non-crossing electrodes may be obtained between $Tx_3$ and $Tx_5$, and between $Rx_3$ and $Rx_5$, respectively. As shown in FIG. 2A, $Tx_3$ and $Tx_5$ are separated by $Tx_4$ and are, therefore, not immediately adjacent in the sensing pattern (200). Accordingly, the mutual capacitance signal $\Delta C_{t,GG}$ between two parallel electrodes ($Tx_3$ and $Tx_5$) may be negligible. The same may apply to the Rx electrodes. Accordingly, in one or more embodiments, the parasitic term resulting from LGM conditions persists, whereas the mutual capacitance term between non-crossing electrodes under good ground condition vanishes. In other words, a pair of non-crossing electrodes is primarily sensitive to LGM conditions.

It may thus be assumed that the measured mutual capacitance term between $Tx_3$ and $Tx_5$ is equal to the negative of the parasitic LGM term which is defined between these two electrodes. The same may hold for $Rx_3$ and $Rx_5$.

A similar effect may be accomplished for smaller input objects (e.g., input objects that are too small to cover a region including $Tx_3$ and $Tx_5$ and/or a region including $Rx_3$ and $Rx_5$), through the introduction of ground electrodes, as shown in FIG. 2B. In this configuration, in a measurement, the mutual capacitance terms may vanish in a good ground condition between $Tx_4$ and $Tx_5$, and $Rx_4$ and $Rx_5$, respectively.

Those skilled in the art will appreciate that the operations of Step 810 are not limited to non-crossing electrodes. The operations may be performed using various other sensor patterns, including the sensor patterns shown in FIG. 3, FIG. 4, and FIG. 5. While the obtaining of LGM terms for Rx electrodes and Tx electrodes is described, it may be possible to perform the LGM correction using a single LGM term (only Rx or only Tx), if the Rx electrodes and the Tx electrodes have the same or similar configuration (shape, spacing, length, etc.).

More generally, the method may first identify whether immediately adjacent electrodes, or electrodes that are separated by an additional electrode are to be used, and then perform the following operations using the immediately adjacent or separated electrodes:

If the largest region on a profile-axis equals two (meaning there are only 2 values in this region, indicating a relatively small finger), the two neighboring electrodes of that region may be used to measure the parasitic LGM term between these non-crossing electrodes, by measuring the mutual capacitance between them.

If the largest region on a profile-axis contains more than two values, the most suitable set of parallel electrodes separated by exactly one electrode may be used to measure the parasitic LGM term between this set of electrodes.

The operation may be performed on both the horizontal and the vertical profile-axes.

Figure 9:
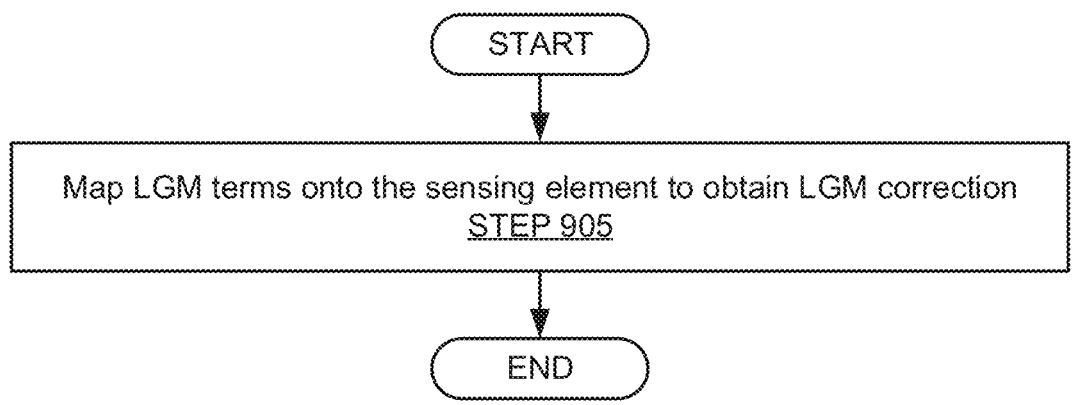
FIG. 9 shows a flowchart, in accordance with one or more embodiments.

Turning to FIG. 9, a method for mapping the one or more LGM terms to the sensing element to obtain an LGM correction is described. The mapping may be necessary because the configuration (e.g., the geometric configuration) of the set of sensor electrodes used for obtaining the LGM term(s), may be different from the configuration of the sensor electrodes that form the sensing element. Without the mapping, the LGM term(s) may not adequately compensate for the LGM condition, at the sensing element. Various methods for performing the mapping may be used. While one particular method is described below, other methods may be used without departing from the disclosure. Generally, any method that enables a scaling of the LGM term(s) may be used. The scaling may be determined based on a ratio reflecting the characteristics of the sensor electrodes used for obtaining the LGM term(s) and the characteristics of the sensor electrodes that form the sensing element. Any method suitable for multiplicative-type errors may be used In Step 905, the LGM terms are mapped onto the sensing element to obtain an LGM correction.

Performing the above operations leads to a 2-dimensional system with two unknowns. Referring to the example of FIG. 2A, one unknown is linked to the parasitic LGM-term between $Rx_3$ and $Tx_5$, the other is linked to the ratio of the LGM-scaling factors of the two profile axes which arise under LGM conditions in profile measurements. The known terms in that two-dimensional system are linked to the parasitic LGM terms between $Rx_3$ and $Rx_5$, and $Tx_3$ and $Tx_5$, respectively, as well as to the profile measurements to $Rx_3$, $Rx_5$, $Tx_3$, and $Tx_5$. This (non-linear) system is uniquely solvable for the unknowns up to the sign. The uniqueness is guaranteed by restricting the formulation to non-negative capacitances without loss of generality.

Also, the absolute capacitive LGM-scaling factors are larger than zero for any LGM condition and as a result, only the positive solution for the ratio of the scaling factors is valid, which guarantees uniqueness of the 2-dimensional system.

More generally, the computations may be slightly different, depending on whether electrodes are immediately adjacent or separated:

If the largest region on both the x-axis and y-axis of the profiles is only two, then the parasitic LGM-term between $Tx_k$ and $Rx_\ell$ is a function of the parasitic LGM-term defined between $Tx_k$ and $Tx_{k+1}$, of the parasitic LGM-term defined between $Rx_\ell$ and $Rx_{\ell+1}$, and of the $Tx_k$, $Tx_{k+1}$, $Rx_\ell$, $Rx_{\ell+1}$ profiles.

If the largest region on the profile's x-axis is only two but greater than two on the y-axis, then the parasitic LGM-term between $Tx_k$ and $Rx_\ell$ is a function of the parasitic LGM-term defined between $Tx_k$ and $Tx_{k+1}$, of the parasitic LGM-term defined between $Rx_\ell$ and $Rx_{\ell+-m}$, of the $Tx_k$, $Tx_{k+1}$, $Rx_\ell$, and $Rx_{\ell+-m}$, profiles, for suitable integers $|m|,|n|>=1$.

If the largest region on the profile's x-axis is larger than two but only two on the y-axis, then the parasitic LGM-term between $Tx_k$ and $Rx_\ell$ is a function of the parasitic LGM-term defined between $Tx_k$ and $Tx_{k+n}$, of the parasitic LGM-term defined between $Rx_\ell$ and $Rx_{\ell+1}$, of the $Tx_k$, $Tx_{k+n}$, $Rx_\ell$, and $Rx_{\ell+1}$ profiles, for a suitable integer $|n|>1$.

If the largest regions on both the profile's x- and y-axes are larger than two, then the parasitic LGM-term between $Tx_k$ and $Rx_\ell$ is a function of the parasitic LGM-term defined between $Tx_k$ and $Tx_{k+n}$, of the parasitic LGM-term defined between $Rx_\ell$ and $Rx_{\ell+m}$, of the $Tx_k$, $X_{k+n}$, $Rx_\ell$, and $Rx_{\ell+m}$ profiles, for suitable integers $|m|,|n|>=1$. A necessary condition for the selection of the integers m and n is that the mutual capacitance between the corresponding non-crossing electrodes under good grounded condition vanishes.

The parasitic LGM-term of Step 905 may be remapped to any other sensing element through appropriate absolute capacitance measurements, or any measurement technique which provides the profiles (such as projections of the mutual capacitance measurements).

Figure 10:
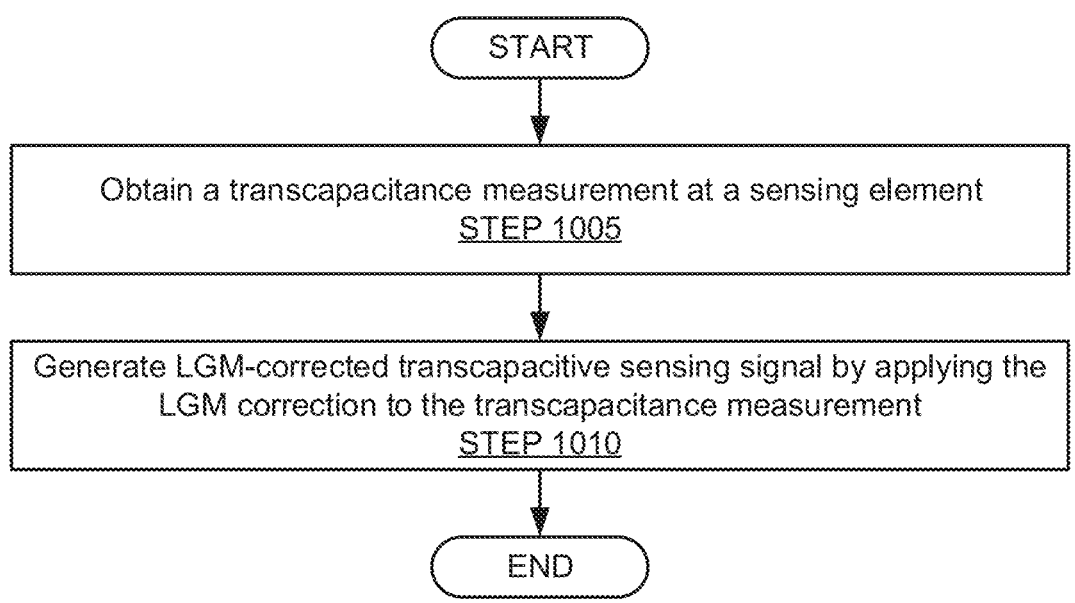
FIG. 10 shows a flowchart, in accordance with one or more embodiments.

Turning to FIG. 10, a method for generating a touch output is described.

In Step 1005, a transcapacitance sensing is obtained. For example, $\Delta C_{t,LGM}^{Rx_4 Tx_4}$ may be obtained.

In Step 1010, in order to compensate for the potential low ground mass artifacts, $C_{LGM}^{Rx_4 Tx_4}$ is added—to obtain $\Delta C_{t,GG}^{Rx_4 Tx_4}$ free of low ground mass artifacts.

More generally: at pixel (m, n), the corrected image $\Delta C_{t,GG}^{mn}$ is obtained by superposing the measurement $\Delta C_{t,LGM}^{mn}$ at the pixel with the LGM correction factor $\Delta C_{LGM}^{mn}$.

While the above methods have been described as being performed for both axes, Tx and Rx, only one axis may be used as an approximation. However, generally, the method is more accurate if performing the operations on both axes, unless the sensor is highly symmetric (same Rx- and Tx-pattern, same electrode length etc.). Further, the obtaining of LGM terms as described in reference to FIG. 8 may be repeatedly performed. Multiple LGM terms may, thus, be obtained for one or both axes. Using the multiple LGM terms, an additional optimization may be performed to determine a final LGM correction. For example, an average LGM correction may be determined. The average may address possible locally deviating LGM terms, e.g., due to the presence of noise sources, inaccurate measurements, etc. Alternatively, different local LGM terms may be used to address an LGM condition that is non-uniform across the sensing region. A pseudo-inverse or a least square optimization may be applied to the LGM terms to finalize the correction term.

Also, the selection of the set(s) of sensor electrodes used for obtaining the LGM term(s) and the selection of the set of sensor electrodes for the sensing element may differ from what has been described, without departing from the disclosure. For example, a sensor electrode may be paired with another sensor electrode to form an LGM-sensitive pair of electrodes. The same sensor electrode may be paired with yet another electrode to form a proximity-sensing pair of electrodes. Any sensor electrode may be paired with any other sensor electrode for both the obtaining the LGM term(s) and for forming the sensing element, as long as certain conditions, as previously discussed, are met.

While not explicitly described, embodiments of the disclosure are not limited to driving only one transmitter electrode at once. When simultaneously driving multiple transmitter electrodes, undesirable charge transfers to a receiver electrode may be avoided using guarding of the receiver electrode. Accordingly, various driving schemes that are not necessarily limited to driving only a single transmitter electrode at once may be used, without departing from the disclosure Embodiments of the disclosure have one or more of the following advantages. Embodiments of the disclosure provide reliable touch detection performance in input devices having a small self-capacitance and/or with a thin stack-up, poor grounding situations, moisture on the touch surface, etc. Low ground mass (LGM) artifacts may be removed without requiring a special sensor pattern design. For sufficiently large objects, the described methods may be performed using any sensor pattern that supports hybrid sensing (transcapacitance and absolute capacitance sensing). Additional cases such as particularly small input objects may be supported because smaller objects suffer less from LGM-artifacts, which is though subject to the underlying LGM-condition.

Hybrid Sensing may not be required if the absolute measurements can be replaced by some transcapacitive measurements which show correct profiles up to a proportionality factor. For example, the profiles may be obtained by summing over the compact supports of the traditionally obtained transcapacitive measurements. Details of obtaining the profiles from transcapacitive measurements may depend on the LGM condition at hand, which also depends on the object size.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A capacitive sensing input system comprising:
   a plurality of sensor electrodes disposed in a sensor electrode pattern, wherein, when under a low ground mass (LGM) condition:
   proximity-sensing pairs of electrodes formed by a first selective pairing of the plurality of sensor electrodes have an increased sensitivity to a presence of an input object in comparison to

LGM-sensitive pairs of electrodes formed by a second selective pairing of the plurality of sensor electrodes that are primarily sensitive to the LGM condition; and a processing system configured to, while under the LGM condition:
prior to determining a first LGM term:
determine a size of the input object, and
depending on the size of the input object, select a spatial separation of the two sensor electrodes of a first of the LGM-sensitive pairs of electrodes,
determine the first LGM term using a mutual capacitance sensing with the first of the LGM-sensitive pairs of electrodes,
obtain a first transcapacitance sensing signal for a sensing element formed by a first of the proximity-sensing pairs of electrodes, and
generate an LGM-corrected transcapacitance sensing signal by correcting the first transcapacitance sensing signal using the first LGM term.

2. The capacitive sensing input system of claim 1, wherein the processing system is further configured to, prior to generating the LGM-corrected transcapacitance sensing signal:
map the first LGM term onto the sensing element.

3. The capacitive sensing input system of claim 1, wherein determining the first LGM term comprises:
determining that the input object is located at the sensing element.

4. The capacitive sensing input system of claim 3, wherein the determination is made based on at least one selected from the group consisting of:
an absolute capacitance profile sensing, and
a transcapacitance profile sensing.

5. The capacitive sensing input system of claim 1, wherein the two sensor electrodes of the first of the LGM-sensitive pairs of electrodes are non-intersecting.

6. The capacitive sensing input system of claim 5, further comprising an additional electrode disposed between the two sensor electrodes of the first of the LGM-sensitive pairs of electrodes.

7. The capacitive sensing input system of claim 6, wherein the additional electrode is one selected from the group consisting of:
a ground electrode, and
a guard electrode.

8. The capacitive sensing input system of claim 1, wherein the two sensor electrodes of the first of the proximity-sensing pairs of electrodes are intersecting.

9. A capacitive sensing input system comprising:
a plurality of sensor electrodes disposed in a sensor electrode pattern, wherein, when under a low ground mass (LGM) condition:
proximity-sensing pairs of electrodes formed by a first selective pairing of the plurality of sensor electrodes have an increased sensitivity to a presence of an input object in comparison to
LGM-sensitive pairs of electrodes formed by a second selective pairing of the plurality of sensor electrodes that are primarily sensitive to the LGM condition; and
a processing system configured to, while under the LGM condition:
determine a first LGM term using a mutual capacitance sensing with a first of the LGM-sensitive pairs of electrodes, wherein the first LGM term is in a first direction of the sensor electrode pattern, based on the first of the LGM-sensitive pairs of electrodes,
obtain a second LGM term with a second of the LGM-sensitive pairs of electrodes, in a second direction of the sensor electrode pattern, perpendicular to the first direction,
obtain a first transcapacitance sensing signal for a sensing element formed by a first of the proximity-sensing pairs of electrodes, and
generate an LGM-corrected transcapacitance sensing signal by correcting the first transcapacitance sensing signal using the first LGM term and the second LGM term.

10. A processing system interfacing with a plurality of sensor electrodes disposed in a sensor electrode pattern,
wherein, when under a low ground mass (LGM) condition:
proximity-sensing pairs of electrodes formed by a first selective pairing of the plurality of sensor electrodes have an increased sensitivity to a presence of an input object in comparison to
LGM-sensitive pairs of electrodes formed by a second selective pairing of the plurality of sensor electrodes that are primarily sensitive to the LGM condition,
wherein the processing system, while under the LGM condition, is configured to:
prior to determining a first LGM term:
determine a size of the input object, and
depending on the size of the input object, selecting a spatial separation of the two sensor electrodes of a first of the LGM-sensitive pairs of electrodes,
determine the first LGM term using a mutual capacitance sensing with the first of the LGM-sensitive pairs of electrodes,
obtain a first transcapacitance sensing signal for a sensing element formed by a first of the proximity-sensing pairs of electrodes, and
generate an LGM-corrected transcapacitance sensing signal by correcting the first transcapacitance sensing signal using the first LGM term.

11. The processing system of claim 10, further configured to, prior to generating the LGM-corrected transcapacitance sensing signal:
map the first LGM term onto the sensing element.

12. The processing system of claim 10, wherein determining the first LGM term comprises:
determining that the input object is located at the sensing element.

13. The processing system of claim 12, wherein the determination is made based on at least one selected from the group consisting of:
an absolute capacitance profile sensing, and
a transcapacitance profile sensing.

14. A processing system interfacing with a plurality of sensor electrodes disposed in a sensor electrode pattern,
wherein, when under a low ground mass (LGM) condition:
proximity-sensing pairs of electrodes formed by a first selective pairing of the plurality of sensor electrodes have an increased sensitivity to a presence of an input object in comparison to
LGM-sensitive pairs of electrodes formed by a second selective pairing of the plurality of sensor electrodes that are primarily sensitive to the LGM condition, wherein the processing system, while under the LGM condition, is configured to:
  determine a first LGM term using a mutual capacitance sensing with a first of the LGM-sensitive pairs of electrodes, wherein the first LGM term is in a first direction of the sensor electrode pattern, based on the first of the LGM-sensitive pairs of electrodes,
  obtain a second LGM term with a second of the LGM-sensitive pairs of electrodes, in a second direction of the sensor electrode pattern, perpendicular to the first direction,
  obtain a first transcapacitance sensing signal for a sensing element formed by a first of the proximity-sensing pairs of electrodes, and
  generate an LGM-corrected transcapacitance sensing signal by correcting the first transcapacitance sensing signal using the first LGM term and the second LGM term.

15. A method of capacitive sensing,
the method operating on a plurality of sensor electrodes disposed in a sensor electrode pattern, wherein, when under a low ground mass (LGM) condition:
  proximity-sensing pairs of electrodes formed by a first selective pairing of the plurality of sensor electrodes have an increased sensitivity to a presence of an input object in comparison to
  LGM-sensitive pairs of electrodes formed by a second selective pairing of the plurality of sensor electrodes that are primarily sensitive to the LGM condition;
the method comprising, while under the LGM condition:
  prior to determining a first LGM term:
    determining a size of the input object, and
    depending on the size of the input object, selecting a spatial separation of the two sensor electrodes of a first of the LGM-sensitive pairs of electrodes,
  determining the first LGM term using a mutual capacitance sensing with the first of the LGM-sensitive pairs of electrodes;
  obtaining a first transcapacitance sensing signal for a sensing element formed by a first of the proximity-sensing pairs of electrodes; and
  generating an LGM-corrected transcapacitance sensing signal by correcting the first transcapacitance sensing signal using the first LGM term.

16. The method of claim 15, wherein obtaining the first LGM term comprises:
  determining that the input object is located at the sensing element.

17. A method of capacitive sensing,
the method operating on a plurality of sensor electrodes disposed in a sensor electrode pattern, wherein, when under a low ground mass (LGM) condition:
  proximity-sensing pairs of electrodes formed by a first selective pairing of the plurality of sensor electrodes have an increased sensitivity to a presence of an input object in comparison to
  LGM-sensitive pairs of electrodes formed by a second selective pairing of the plurality of sensor electrodes that are primarily sensitive to the LGM condition;
the method comprising, while under the LGM condition:
  determining a first LGM term using a mutual capacitance sensing with a first of the LGM-sensitive pairs of electrodes, wherein the first LGM term is in a first direction of the sensor electrode pattern, based on the first of the LGM-sensitive pairs of electrodes;
  obtaining a second LGM term with a second of the LGM-sensitive pairs of electrodes, in a second direction of the sensor electrode pattern, perpendicular to the first direction;
  obtaining a first transcapacitance sensing signal for a sensing element formed by a first of the proximity-sensing pairs of electrodes; and
  generating an LGM-corrected transcapacitance sensing signal by correcting the first transcapacitance sensing signal using the first LGM term and the second LGM term.

* * * * *